US008041487B2

(12) United States Patent
Worthing et al.

(10) Patent No.: US 8,041,487 B2
(45) Date of Patent: Oct. 18, 2011

(54) COMMANDED AND ESTIMATED ENGINE TORQUE ADJUSTMENT

(75) Inventors: James L. Worthing, Munith, MI (US); Michael Livshiz, Ann Arbor, MI (US); Christopher E. Whitney, Highland, MI (US); Ning Jin, Novi, MI (US); Martin Weber, Frankfurt (DE); Enrico Tropschug, Hattersheim (DE)

(73) Assignee: GM Global Technology Operations LLC

( * ) Notice: Subject to any disclaimer, the term of this patent is extended or adjusted under 35 U.S.C. 154(b) by 420 days.

(21) Appl. No.: 12/397,721

(22) Filed: Mar. 4, 2009

(65) Prior Publication Data

US 2010/0057283 A1 Mar. 4, 2010

Related U.S. Application Data

(60) Provisional application No. 61/092,938, filed on Aug. 29, 2008.

(51) Int. Cl.

| | |
|---|---|
| ***F02D 43/00*** | (2006.01) |
| ***F02M 7/00*** | (2006.01) |
| *G06F 17/00* | (2006.01) |

(52) U.S. Cl. ........................... 701/54; 701/102; 123/436

(58) Field of Classification Search .................... 701/54, 701/102, 84, 103, 69; 123/436, 344, 481, 123/672

See application file for complete search history.

(56) References Cited

U.S. PATENT DOCUMENTS

| | | | | |
|---|---|---|---|---|
| 5,732,676 | A * | 3/1998 | Weisman et al. | 123/436 |
| 6,367,462 | B1 * | 4/2002 | McKay et al. | 123/568.21 |
| 6,770,009 | B2 * | 8/2004 | Badillo et al. | 477/102 |

* cited by examiner

*Primary Examiner* — Tan Q Nguyen

(57) ABSTRACT

An engine control system comprises first and second integral modules, a summer module, and a torque adjustment module. The first integral module determines an engine speed (RPM) integral value based on a difference between a desired RPM and a measured RPM. The second integral module determines a torque integral value based on a difference between a desired torque output for an engine and an estimated torque of the engine. The summer module determines an RPM-torque integral value based on a difference between the RPM and torque integral values. The torque adjustment module determines a torque adjustment value based on the RPM-torque integral value and adjusts the desired torque output and the estimated torque based on the torque adjustment value.

34 Claims, 6 Drawing Sheets

COMMANDED AND ESTIMATED ENGINE TORQUE ADJUSTMENT

CROSS-REFERENCE TO RELATED APPLICATIONS

This application claims the benefit of U.S. Provisional Application No. 61/092,938, filed on Aug. 29, 2008. The disclosure of the above application is incorporated herein by reference.

FIELD

The present disclosure relates to internal combustion engines and more particularly to control systems and methods for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises first and second integral modules, a summer module, and a torque adjustment module. The first integral module determines an engine speed (RPM) integral value based on a difference between a desired RPM and a measured RPM. The second integral module determines a torque integral value based on a difference between a desired torque output for an engine and an estimated torque of the engine. The summer module determines an RPM-torque integral value based on a difference between the RPM and torque integral values. The torque adjustment module determines a torque adjustment value based on the RPM-torque integral value and adjusts the desired torque output and the estimated torque based on the torque adjustment value.

In other features, the engine control system further comprises a disabling module that disables the torque adjustment module when an engine runtime is less than a predetermined period.

In still other features, the engine control system further comprises a disabling module that disables the torque adjustment module when an air-per-cylinder (APC) is greater than a predetermined APC.

In further features, the engine control system further comprises a disabling module that disables the torque adjustment module when a change in air-per-cylinder (APC) is greater than a predetermined APC change.

In still further features, the engine control system further comprises a disabling module that disables the torque adjustment module when an electric motor (EM) torque output is greater than a predetermined torque.

In other features, the engine control system further comprises a disabling module that disables the torque adjustment module when a change in torque output by an electric motor (EM) is greater than a predetermined EM torque change.

In still other features, the engine control system further comprises a disabling module that disables the torque adjustment module when a vehicle speed is greater than a predetermined vehicle speed.

In further features, the engine control system further comprises a disabling module that disables the torque adjustment module when the measured RPM is greater than a predetermined RPM.

In still further features, the engine control system further comprises a disabling module that disables the torque adjustment module when the difference between the desired and measured RPMs is greater than a predetermined RPM error.

In other features, the engine control system further comprises a disabling module that disables the torque adjustment module when a transmission oil temperature is less than a predetermined temperature.

In still other features, the engine control system further comprises a disabling module that disables the torque adjustment module when an engine coolant temperature (ECT) is one of less than a predetermined minimum ECT and greater than a predetermined maximum ECT.

In further features, the engine control system further comprises a disabling module that disables the torque adjustment module when an intake air temperature (IAT) is greater than a predetermined IAT.

In still further features, the engine control system further comprises a disabling module that disables the torque adjustment module when a change in intake air temperature (IAT) is greater than a predetermined IAT change.

In other features, the engine control system further comprises a predicted torque control module that adjusts at least one engine airflow actuator based on the adjusted desired torque output.

In still other features, the torque adjustment module selectively increases the torque adjustment value based on a predetermined torque offset when a transmission is in one of drive and reverse.

In further features, the torque adjustment module selectively increases the torque adjustment value based on a predetermined torque offset when an air conditioning (A/C) compressor is ON.

In still further features, the torque adjustment module adds the torque adjustment value to each of the desired torque output and the estimated torque.

An engine control method comprises: determining an engine speed (RPM) integral value based on a difference between a desired RPM and a measured RPM; determining a torque integral value based on a difference between a desired torque output for an engine and an estimated torque of the engine; determining an RPM-torque integral value based on a difference between the RPM and torque integral values;

determining a torque adjustment value based on the RPM-torque integral value; and adjusting the desired torque output and the estimated torque based on the torque adjustment value.

In other features, the engine control method further comprises disabling the adjusting when an engine runtime is less than a predetermined period.

In still other features, the engine control method further comprises disabling the adjusting when an air-per-cylinder (APC) is greater than a predetermined APC.

In further features, the engine control method further comprises disabling the adjusting when a change in air-per-cylinder (APC) is greater than a predetermined APC change.

In still further features, the engine control method further comprises disabling the adjusting when an electric motor (EM) torque output is greater than a predetermined torque.

In other features, the engine control method further comprises disabling the adjusting when a change in torque output by an electric motor (EM) is greater than a predetermined EM torque change.

In still other features, the engine control method further comprises disabling the adjusting when a vehicle speed is greater than a predetermined vehicle speed.

In further features, the engine control method further comprises disabling the adjusting when the measured RPM is greater than a predetermined RPM.

In still further features, the engine control method further comprises disabling the adjusting when the difference between the desired and measured RPMs is greater than a predetermined RPM error.

In other features, the engine control method further comprises disabling the adjusting when a transmission oil temperature is less than a predetermined temperature.

In still other features, the engine control method further comprises disabling the adjusting when an engine coolant temperature (ECT) is one of less than a predetermined minimum ECT and greater than a predetermined maximum ECT.

In further features, the engine control method further comprises disabling the adjusting when an intake air temperature (IAT) is greater than a predetermined IAT.

In still further features, the engine control method further comprises disabling the adjusting when a change in intake air temperature (IAT) is greater than a predetermined IAT change.

In other features, the engine control method further comprises adjusting at least one engine airflow actuator based on the adjusted desired torque output.

In still other features, the engine control method further comprises selectively increasing the torque adjustment value based on a predetermined torque offset when a transmission is in one of drive and reverse.

In further features, the engine control method further comprises selectively increasing the torque adjustment value based on a predetermined torque offset when an air conditioning (A/C) compressor is ON.

In still further features, the adjusting comprises adding the torque adjustment value to each of the desired torque output and the estimated torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
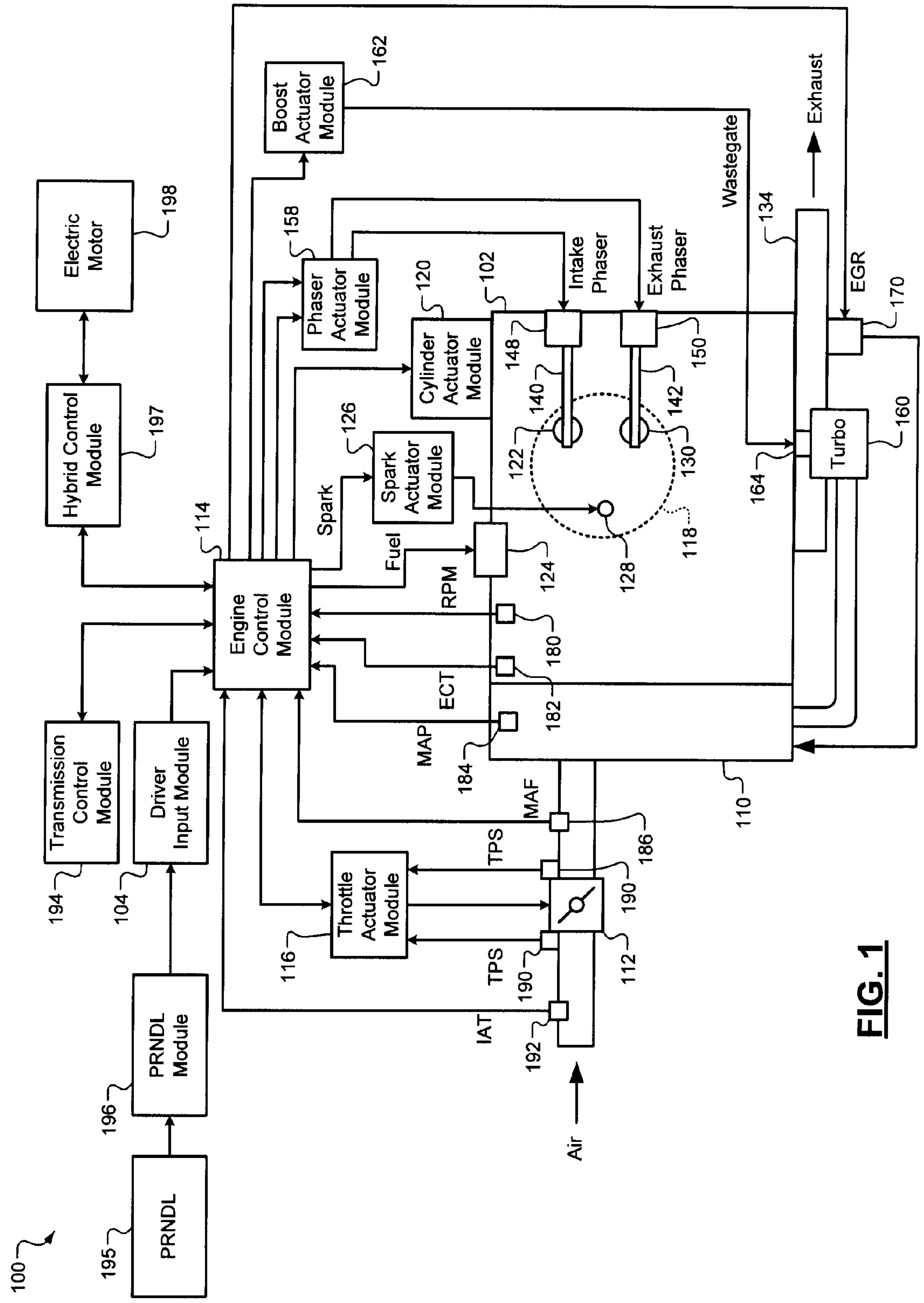
FIG. 1 is a functional block diagram of an exemplary engine system according to the principles of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module (ECM) controls engine air actuators based on a desired torque output for an engine. The ECM determines an estimated torque of the engine based on positions of one or more of the engine air actuators. The ECM uses the estimated torque as feedback for controlling the desired torque output in closed-loop. The ECM of the present disclosure determines a torque adjustment value when specified operating conditions are satisfied. The ECM adjusts the desired torque output and the estimated torque output based on the torque adjustment value.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes only, a single representative cylinder 118 is shown. For example only, the engine 102 may include 2, 3, 4, 5, 6, 8, 10, and/or 12 cylinders. The ECM

114 may selectively instruct a cylinder actuator module 120 to deactivate one or more of the cylinders, for example, to improve fuel economy.

Air from the intake manifold 110 is drawn into the cylinder 118 through an associated intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve 122. In other implementations, the fuel injection system 124 may inject fuel directly into the cylinder 118.

The injected fuel mixes with the air and creates the air/fuel mixture. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed. While the principles of the present disclosure will be described in terms of a gasoline-type engine system, the present disclosure are applicable to other types of engine systems, such as a diesel-type engine system and hybrid engine systems.

Combustion of the air/fuel mixture drives the piston away from the TDC position, thereby driving a rotating crankshaft (not shown). The piston then begins moving up again and expels the byproducts of combustion through an exhaust valve 130 that is associated with the cylinder 118. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate the cylinder 118 by halting provision of fuel and spark and/or disabling the exhaust and/or intake valves 122 and 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may also include a boost device that provides pressurized air to the intake manifold 110. For example, FIG. 1 depicts a turbocharger 160. The turbocharger 160 is powered by exhaust gas flowing through the exhaust system 134 and provides a compressed air charge to the intake manifold 110. The air used to produce the compressed air charge may be taken from the intake manifold 110 and/or another suitable source.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164.

The compressed air charge is provided to the intake manifold 110 by the turbocharger 160. An intercooler (not shown) may dissipate some of the compressed air charge's heat, which is generated when the air is compressed and may also be increased by proximity to the exhaust system 134. Alternate engine systems may include a supercharger that provides compressed air to the intake manifold 110 and is driven by the crankshaft. The engine system 100 may include an exhaust gas recirculation (EGR) valve 170, which selectively redirects exhaust gas back to the intake manifold 110.

An engine speed (RPM) sensor 180 measures the speed of the crankshaft in revolutions per minute (rpm). The temperature of the engine coolant may be measured using an engine coolant temperature (ECT) sensor 182. The ECT sensor 182 may be located within the engine 102 or at another location where the coolant is circulated, such as in a radiator (not shown).

A manifold absolute pressure (MAP) sensor 184 measures the pressure within the intake manifold 110. In various implementations, engine vacuum may be measured, where engine vacuum is the difference between ambient air pressure and the pressure within the intake manifold 110. A mass air flow (MAF) sensor 186 measures the mass flowrate of air flowing into the intake manifold 110.

The throttle actuator module 116 may monitor the position of the throttle valve 112 using one or more throttle position sensors (TPS) 190. The temperature of the air drawn into the engine system 100 may be measured using an intake air temperature (IAT) sensor 192. An ambient air temperature sensor (not shown) measures the temperature of ambient air. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The driver may manipulate a park, reverse, neutral, drive lever (PRNDL) 195 to command operation of the transmission in a desired mode of operation. A PRNDL module 196 monitors the PRNDL 195 and outputs a transmission state signal based on the PRNDL 195. The ECM 114 transmits the transmission state signal to the transmission control module 194 to control the transmission state. For example only, the transmission state may be a park, reverse, neutral, or drive state.

The ECM 114 may also communicate with a hybrid control module 197 to coordinate operation of the engine 102 and an electric motor 198. The electric motor 198 may also function as a generator and may be used to produce electrical energy for use by vehicle electrical systems and/or for storage in a battery.

To abstractly refer to the various control mechanisms of the engine 102, each system or module that varies an engine parameter may be referred to as an actuator. For example, the throttle actuator module 116 can change the opening area of the throttle valve 112. The throttle actuator module 116 may therefore be referred to as an actuator, and the throttle opening area can be referred to as an actuator position.

Similarly, the spark actuator module 126 can be referred to as an actuator, while the corresponding actuator position is an amount of a spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When the engine 102 transitions from producing one amount of torque to producing a new amount of torque, one or more of the actuator positions will be adjusted to produce the new torque efficiently. For example, the spark advance, throttle position, exhaust gas recirculation (EGR) opening, and cam phaser positions may be adjusted.

Changing one or more actuator positions, however, often creates engine conditions that would benefit from changes to other actuator positions. Changes to the other actuator positions might then benefit from changes to the actuator positions that were first adjusted. This feedback results in iteratively updating actuator positions until each actuator is positioned to allow the engine 102 to produce a desired torque as efficiently as possible.

Large changes in desired torque often cause significant changes in actuator positions, which cyclically cause significant change in other actuator positions. This is especially true when using a boost device, such as the turbocharger 160 or a supercharger. For example, when the engine 102 is commanded to significantly increase a torque output, the ECM 114 may request that the turbocharger 160 increase boost.

In various implementations, when boost pressure is increased, detonation, or engine knock, is more likely. Therefore, as the turbocharger 160 approaches this increased boost level, the spark advance may need to be decreased. Once the spark advance is decreased, the desired boost may need to be increased to allow the engine 102 to achieve the desired torque.

Figure 2:
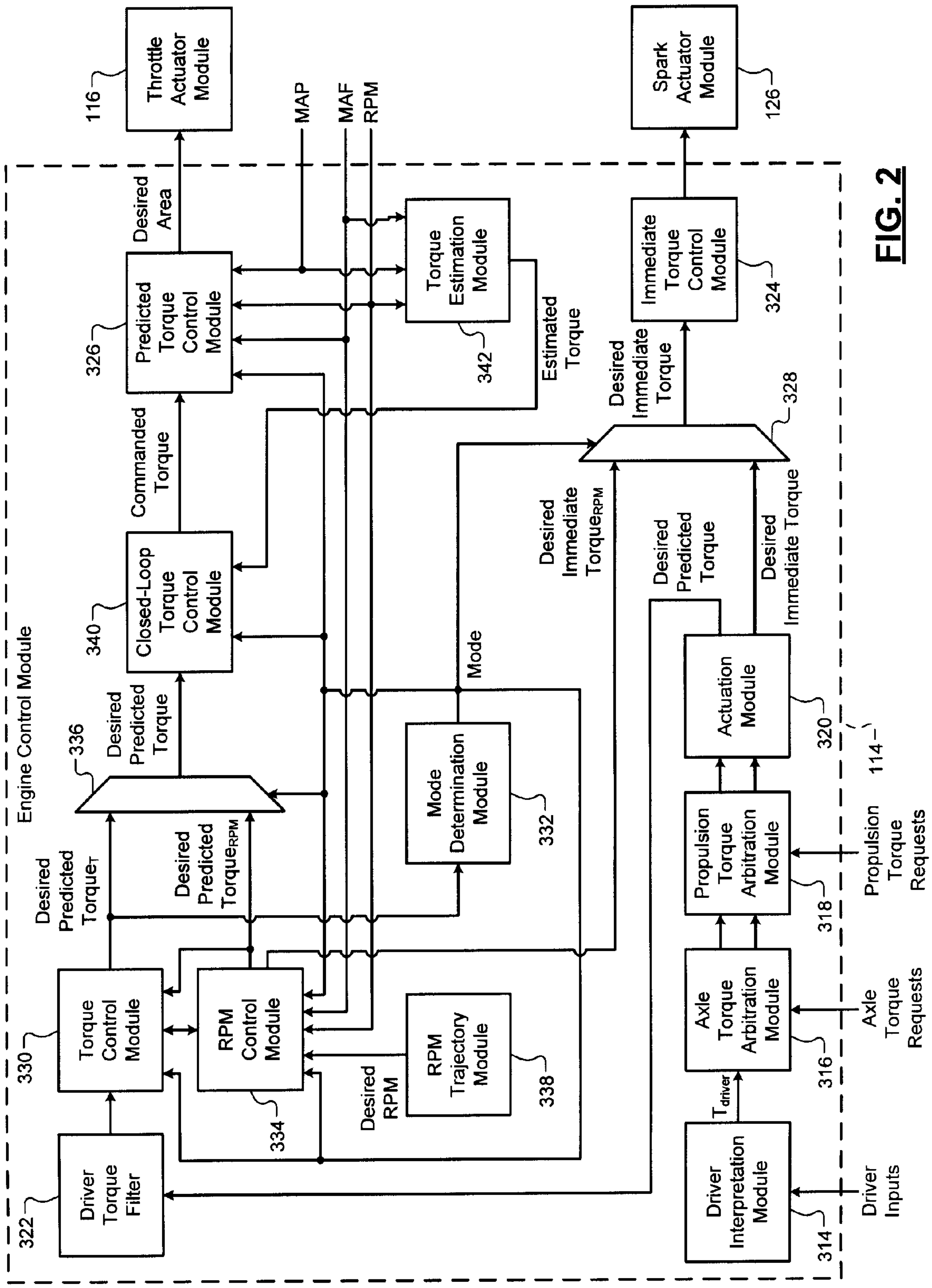
FIG. 2 is a functional block diagram of an exemplary implementation of an engine control module (ECM) according to the principles of the present disclosure.

This circular dependency causes the engine to reach the desired torque more slowly. This problem may be further exacerbated because of the already slow response of turbocharger boost, commonly referred to as turbo lag. FIG. 2 depicts an exemplary implementation of the ECM 114 capable of accelerating the circular dependency of traditional engine control systems.

Referring now to FIG. 2, a functional block diagram of an exemplary implementation of the ECM 114 is presented. The ECM 114 coordinates various controls of the engine system 100. The ECM 114 includes a driver interpretation module 314 that receives driver inputs from the driver input module 104. For example, the driver inputs may include an accelerator pedal position. The driver interpretation module 314 outputs a driver torque request based on the driver inputs, which corresponds to an amount of torque requested by a driver.

The ECM 114 also includes an axle torque arbitration module 316. The axle torque arbitration module 316 arbitrates between the driver torque requests and other axle torque requests. Other axle torque requests may include, for example, torque reduction requests during a gear shift by the transmission control module 194, torque reduction requests during wheel slip by a traction control system (not shown), and torque requests to control speed from a cruise control system (not shown).

The axle torque arbitration module 316 outputs a predicted torque request and an immediate torque request. The predicted torque request corresponds to the amount of torque that will be required in the future to meet the driver's torque and/or speed requests. The immediate torque request corresponds to the amount of torque required at the present moment to meet temporary torque requests, such as torque reductions during shifting gears and/or wheel slip.

The immediate torque request will be achieved via engine actuators that respond quickly, while slower engine actuators are targeted to achieve the predicted torque request. For example only, the spark actuator module 126 may be able to quickly change the spark advance, and thus may be used to achieve the immediate torque request in gasoline engine systems. In diesel systems, fuel mass and/or timing of fuel injection may be the primary actuator for controlling engine torque output. The throttle valve 112 and the intake and exhaust cam phasers 148 and 150, however, may be respond mode slowly and, therefore, may be targeted to meet the predicted torque request.

The axle torque arbitration module 316 outputs the predicted and immediate torque requests to a propulsion torque arbitration module 318. In other implementations, the ECM 114 may also include a hybrid torque arbitration module (not shown). The hybrid torque arbitration module determines what, if any, of the predicted and immediate torque requests will be apportioned to the electric motor 198.

The propulsion torque arbitration module 318 arbitrates between the predicted torque request, the immediate torque request, and propulsion torque requests. Propulsion torque requests may include, for example, torque reduction requests for engine over-speed protection and/or torque increase requests for stall prevention.

An actuation module 320 receives the predicted torque request and the immediate torque request from the propulsion torque arbitration module 318. The actuation module 320 determines how the predicted torque request and the immediate torque request will be achieved. Once the actuation module 320 determines how the predicted and immediate torque requests will be achieved, the actuation module 320 outputs a desired predicted torque and a desired immediate torque to a driver torque filter 322 and a first selection module 328, respectively.

The driver torque filter 322 receives the desired predicted torque from the actuation module 320. The driver torque filter 322 may also receive signals from the axle torque arbitration module 316 and/or the propulsion torque arbitration module 318. For example only, the driver torque filter 322 may use signals from the axle and/or predicted torque arbitration modules 316 and 318 to determine whether the desired predicted torque is a result of driver input. If so, the driver torque filter 322 filters high frequency changes from the desired predicted torque. Such a filtering removes high frequency changes that may be caused by, for example, the driver's foot modulating the accelerator pedal while on rough road.

The driver torque filter 322 outputs the desired predicted torque to a torque control module 330. The torque control module 330 determines a torque control desired predicted torque (i.e., a desired predicted torque$_T$) based on the desired predicted torque. A mode determination module 332 determines a control mode based on the torque control desired predicted torque and outputs a mode signal corresponding to the control mode.

For example only, the mode determination module 332 may determine that the control mode is an RPM mode when the desired predicted torque$_T$ is less than a calibrated torque. When the desired predicted torque$_T$ is greater than or equal to the calibrated torque, the mode determination module 332 may determine that the control mode is a torque mode. For example only, the mode determination module 332 may determine the control mode using the relationships:

$$\text{Control mode}=\text{RPM mode if Desired Predicted Torque}_T<\text{Cal}_T\text{, and}$$

$$\text{Control mode}=\text{Torque mode if Desired Predicted Torque}_T>\text{CAL}_T\text{,}$$

where Desired Predicted Torque$_T$ is the torque control desired predicted torque and CAL$_T$ is the calibrated torque.

The torque control module 330 may also determine the torque control desired predicted torque based on the control mode and/or an RPM control desired predicted torque (i.e., a desired predicted torque$_{RPM}$). The RPM control desired predicted torque is described in detail below. Further discussion of the functionality of the torque control module 330 may be found in commonly assigned U.S. Pat. No. 7,021,282, issued on Apr. 4, 2006 and entitled "Coordinated Engine Torque Control," the disclosure of which is incorporated herein by reference in its entirety.

The torque control module 330 outputs the torque control desired predicted torque to a second selection module 336. For example only, the first selection module 328 and the second selection module 336 may include a multiplexer or another suitable switching or selection device.

An RPM trajectory module 338 determines a desired RPM based on a standard block of RPM control described in detail in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety. For example only, the desired RPM may be a desired idle RPM, a stabilized RPM, and/or a target RPM.

An RPM control module 334 determines the RPM control desired predicted torque (i.e., the desired predicted torque$_{RPM}$) and provides the RPM control desired predicted torque to the torque control module 330. As described above, the torque control module 330 may determine the torque control desired predicted torque based on the RPM control desired predicted torque. The RPM control module 334 determines the RPM control desired predicted torque based on a minimum torque, a feed-forward torque, a reserve torque, and an RPM correction factor.

Figure 3A:
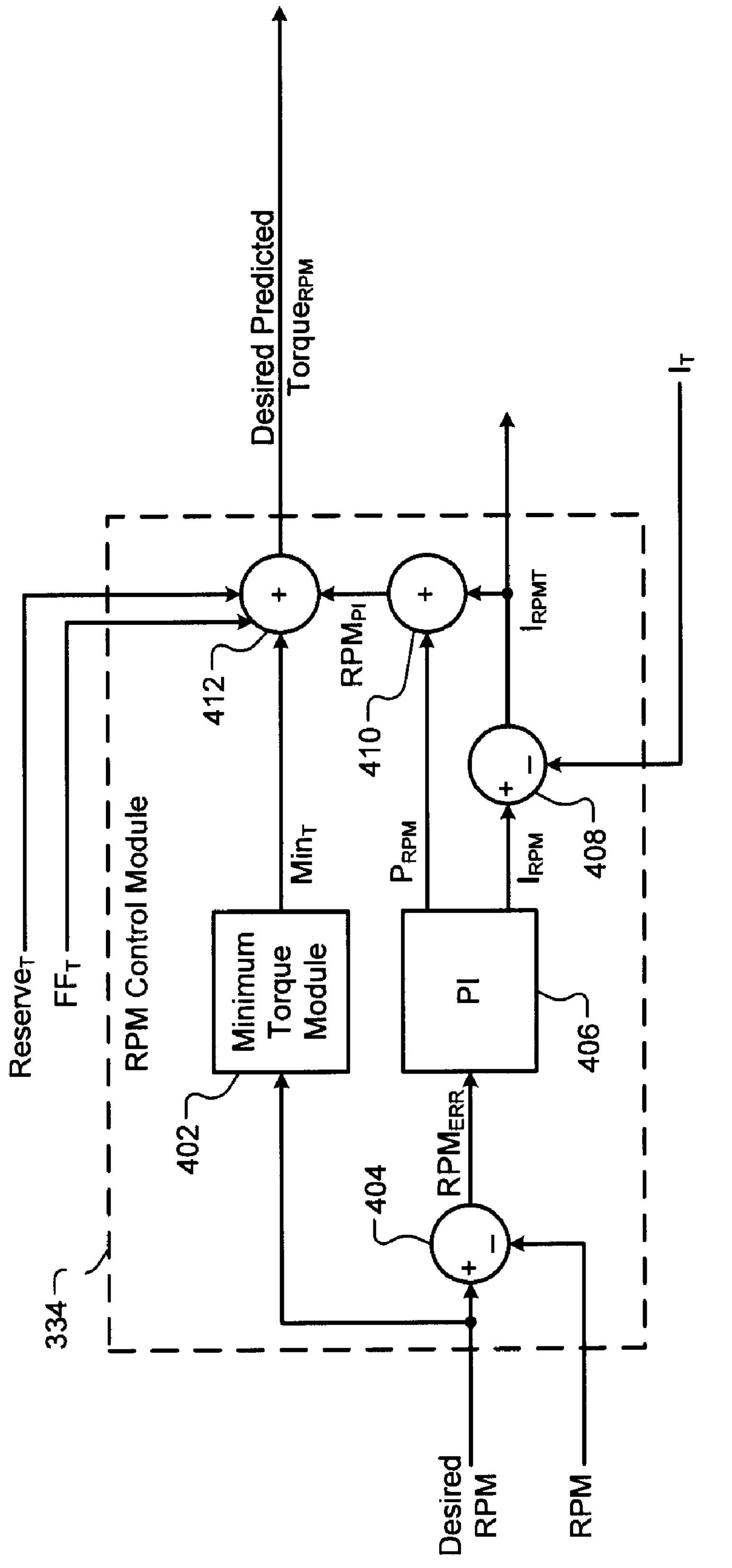
FIG. 3A is a functional block diagram of an exemplary implementation of an engine speed (RPM) control module according to the principles of the present disclosure.

Referring now to FIG. 3A, a functional block diagram of an exemplary implementation of the RPM control module 334 is presented. The RPM control module 334 may include a minimum torque module 402, a first difference module 404, and a proportional-integral (PI) module 406. The RPM control module 334 may also include a second difference module 408, a first summer module 410, and a second summer module 412.

The minimum torque module 402 determines the minimum torque based on the desired RPM. The minimum torque corresponds to a minimum amount of torque to maintain the RPM at the desired RPM. The minimum torque module 402 may determine the minimum torque from, for example, a lookup table based on the desired RPM.

The first difference module 404 determines an RPM error value (i.e., an RPM$_{ERR}$) based on the difference between the desired RPM and the RPM measured by the RPM sensor 180. For example only, the first difference module 404 may determine the RPM error value using the equation:

$$\text{RPM error value}=\text{Desired RPM}-\text{RPM}. \quad (1)$$

The PI module 406 determines an RPM proportional term (i.e., a P$_{RPM}$) and an RPM integral term (i.e., a I$_{RPM}$) based on the RPM error value. The RPM proportional term corresponds to an offset determined based on the RPM error value. The RPM integral term corresponds to an offset determined based on an integral of the RPM error value. For example only, the PI module 406 may determine the RPM proportional and integral terms using the equations:

$$P_{RPM}=K_P*RPM_{DES}-\text{RPM, and} \quad (2)$$

$$I_{RPM}=K_I*\int(\text{RPM}_{DES}-\text{RPM})dt, \quad (3)$$

where $K_P$ is a predetermined RPM proportional constant, $K_I$ is a predetermined RPM integral constant, and $RPM_{DES}$ is the desired RPM. Further discussion of PI control can be found in commonly assigned U.S. patent application Ser. No. 11/656,929, filed Jan. 23, 2007, and entitled "Engine Torque Control at High Pressure Ratio," the disclosure of which is incorporated herein by reference in its entirety. Further discussion of PI control of engine speed can be found in commonly assigned U.S. Pat. App. No. 60/861,492, filed Nov. 28, 2006, and entitled "Torque Based Engine Speed Control," the disclosure of which is incorporated herein by reference in its entirety.

The second difference module 408 determines an RPM-torque integral term (i.e., $I_{RPMT}$) based on a difference between the RPM integral term and a torque integral term (i.e., $I_T$). The torque integral term is discussed in detail below. For example only, the second difference module 408 may determine the RPM-torque integral term using the equation:

$$I_{RPMT}=I_{RPM}-I_T, \quad (4)$$

where $I_{RPMT}$ is the RPM-torque integral term, $I_{RPM}$ is the RPM integral term, and $I_T$ is the torque integral term.

The first summer module 410 determines an RPM correction factor (i.e., RPM$_{PI}$) based on the RPM-torque integral term and the RPM proportional term. More specifically, the first summer module 410 determines the RPM correction factor based on a sum of RPM-torque integral term and the RPM proportional term. For purposes of illustration only, the first summer module 410 determines the RPM correction factor using the equation:

$$\text{RPM}_{PI}=P_{RPM}+I_{RPMT}, \quad (5)$$

where RPM$_{PI}$ is the RPM correction factor, $P_{RPM}$ is the RPM proportional term, and $I_{RPMT}$ is the RPM-torque integral term.

The second summer module 412 determines the RPM control desired predicted torque (i.e., the desired predicted torque$_{RPM}$) based on the minimum torque, the RPM correction factor, a feed-forward torque, and a reserve torque. More specifically, the second summer module 412 determines the RPM control desired predicted torque based on a sum of the minimum torque, the reserve torque, the feed-forward torque, and the RPM correction factor. For purposes of illustration only, the second summer module 412 determines the RPM control desired predicted torque using the equation:

$$\text{Desired predicted torque}_{RPM}=\text{Reserve}_T+\text{FF}_T+\text{Min}_T+\text{RPM}_{PI}, \quad (6)$$

where desired predicted torque$_{RPM}$ is the RPM control desired predicted torque, Reserve$_T$ is the reserve torque, FFT is the feed-forward torque, Min$_T$ is the minimum torque, and RPM$_{PI}$ is the RPM correction factor.

The reserve torque corresponds to an amount of torque that the engine 102 is currently capable of producing in excess of torque that the engine 102 is currently producing under the current airflow conditions. The reserve torque can be used to compensate for loads that could suddenly cause a decrease in the RPM. The feed-forward torque corresponds to an amount of torque that will be required to meet anticipated engine loads, such as activation of an air conditioning (A/C) compressor (not shown).

Referring back to FIG. 2, the RPM control module 334 outputs the RPM control desired predicted torque to the second selection module 336. The second selection module 336 also receives the torque control desired predicted torque from the torque control module 330. The RPM control module 334 also outputs an RPM control desired immediate torque (i.e., Desired Immediate Torque$_{RPM}$) to the first selection module 328.

The second selection module 336 selects and outputs one of the torque control and RPM control desired predicted torques based on the control mode. The second selection module 336 receives the control mode from the mode determination module 332. For example only, the second selection module 336 selects and outputs the torque control desired predicted torque when the control mode is the torque mode. The second selection module 336 selects and outputs the RPM control desired predicted torque when the control mode is the RPM mode.

The output of the second selection module 336 is referred to as the desired predicted torque. A closed-loop torque control module 340 determines a commanded torque based on the desired predicted torque and a torque correction factor (i.e., $T_{PI}$). The commanded torque corresponds to torque that the engine 102 is commanded to output.

Figures 3B, 3C, 3D:
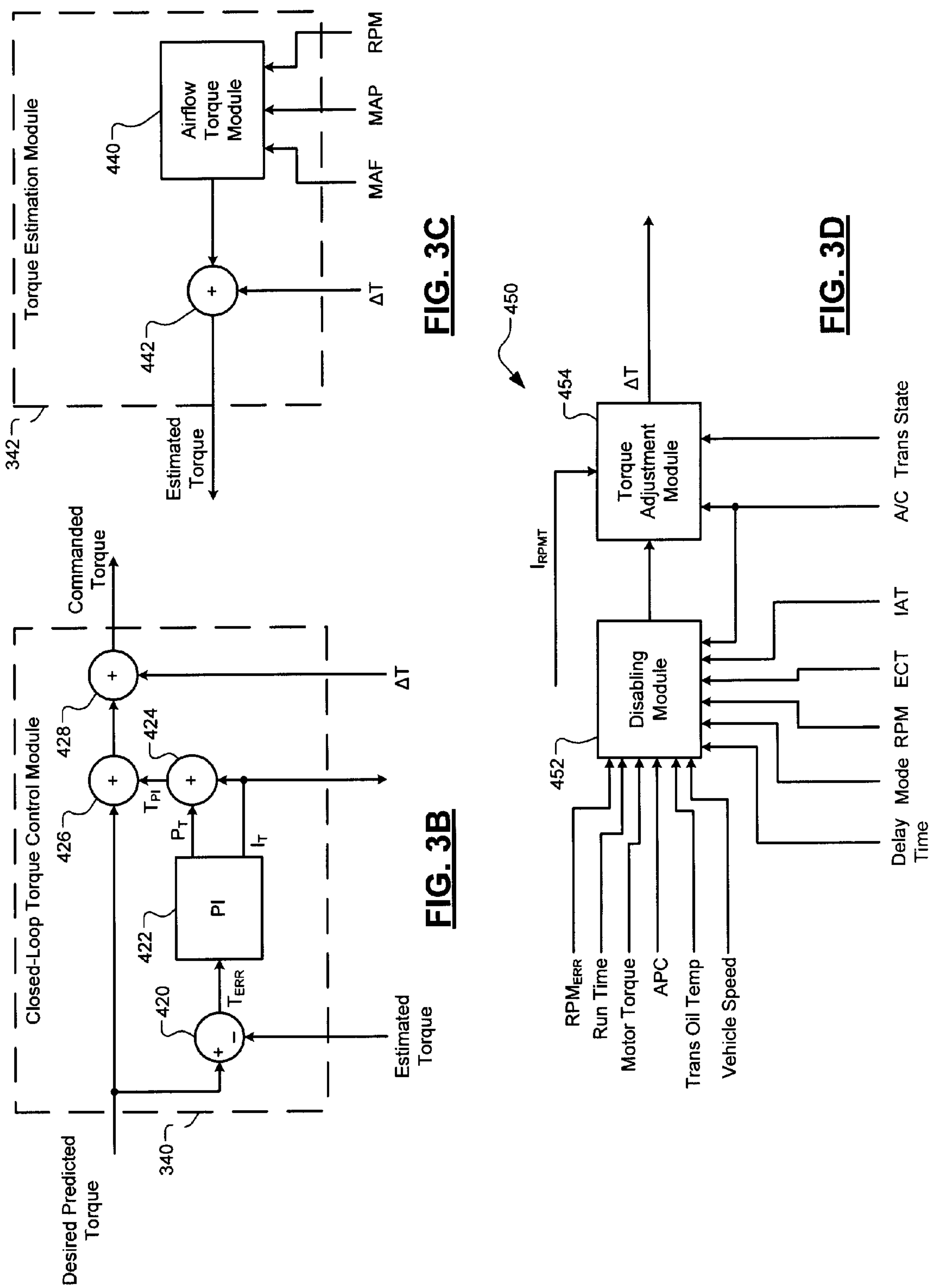
FIG. 3B is a functional block diagram of an exemplary implementation of a closed-loop torque control module according to the principles of the present disclosure.
FIG. 3C is a functional block diagram of an exemplary implementation of a torque estimation module according to the principles of the present disclosure.
FIG. 3D is a functional block diagram of an exemplary torque adjustment system according to the principles of the present disclosure.

Referring now to FIG. 3B, a functional block diagram of an exemplary implementation of the closed-loop torque control module 340 is presented. The closed-loop torque control module 340 may include a third difference module 420, a second proportional-integral (PI) module 422, and a third summer module 424. The closed-loop torque control module 340 may also include a fourth summer module 426 and a fifth summer module 428.

The third difference module 420 determines a torque error value (i.e., $T_{ERR}$) based on a difference between the desired predicted torque and an estimated torque. The estimated torque is discussed in detail below. For example only, the third difference module 420 may determine the torque error value using the equation:

$$T_{ERR}=\text{Desired Predicted Torque}-\text{Estimated Torque}, \quad (7)$$

where $T_{ERR}$ is the torque error value.

The PI module 422 determines a torque proportional term (i.e., a $P_T$) and the torque integral term (i.e., the $I_T$) based on the torque error value. The torque proportional term corresponds to an offset determined based on the torque error value. The torque integral term corresponds to an offset determined based on an integral of the torque error value. For example only, the PI module 422 may determine the torque proportional and integral terms using the equations:

$$P_T=K_P*(\text{Desired Predicted Torque}-\text{Estimated Torque}), \text{ and} \quad (8)$$

$$I_T=K_T*\int(\text{Desired Predicted Torque}-\text{Estimated Torque})\,dt, \quad (9)$$

where $K_P$ is a predetermined torque proportional constant and $K_I$ is a predetermined torque integral constant.

The torque integral term is output to the second difference module 408, as described above. In this manner, the torque integral term is reflected in the RPM control desired predicted torque (i.e., the desired predicted $\text{torque}_{RPM}$). Further, as the RPM control desired predicted torque is selected and output by the second selection module 336 when the control mode is the RPM mode, the torque integral term is reflected in the desired predicted torque when the control mode is the RPM mode.

The third summer module 424 determines the torque correction factor (i.e., the $T_{PI}$) based on a sum of the torque proportional term and the torque integral term. For purposes of illustration only, the third summer module 424 determines the torque correction factor using the equation:

$$T_{PI}=P_T+I_T, \quad (10)$$

where $T_{PI}$ is the torque correction factor, $P_T$ is the torque proportional term, and $I_T$ is the torque integral term.

The fourth summer module 426 determines a first torque command based on a sum of the torque correction factor and the desired predicted torque. The first torque command will be used to determine the commanded torque, as discussed further below. For purposes of illustration only, the fourth summer module 426 determines the first torque command using the equation:

$$TC_1=\text{Desired Predicted Torque}+T_{PI}, \quad (11)$$

where $TC_1$ is the first torque command and $T_{PI}$ is the torque correction factor.

The fifth summer module 428 determines and outputs the commanded torque based on a sum of the first torque command and a torque adjustment value (i.e., a ΔT). In this manner, the commanded torque reflects the torque adjustment value when the torque adjustment value is a value other than zero. The torque adjustment value is discussed in detail below.

Referring back to FIG. 2, a torque estimation module 342 determines the estimated torque and provides the estimated torque to the closed-loop torque control module 340. More specifically, the torque estimation module 342 provides the estimated torque to the third difference module 420 (See FIG. 3B). As described above, the third difference module 420 determines the torque error value based on the difference between the desired predicted torque and the estimated torque.

Referring now to FIG. 3C, a functional block diagram of an exemplary implementation of the torque estimation module 342 is presented. The torque estimation module 342 includes an airflow torque module 440 that determines an airflow torque. The airflow torque will be used to determine the estimated torque, as described further below.

The airflow torque module 440 determines the airflow torque based on the MAF measured by the MAF sensor 186, the RPM measured by the RPM sensor 180, and/or the MAP measured by the MAP sensor 184. The MAP, the MAF, and/or the RPM may also be used to determine the air-per-cylinder (APC).

The airflow torque corresponds to a maximum amount of torque that the engine 102 is capable of producing under the current airflow conditions. The engine 102 may be capable of producing this maximum amount of torque when, for example, the spark timing is set to a spark timing calibrated to produce the maximum amount of torque under the current RPM and APC. Further discussion of the airflow torque can be found in commonly assigned U.S. Pat. No. 6,704,638, issued on Mar. 9, 2004 and entitled "Torque Estimator for Engine RPM and Torque Control," the disclosure of which is incorporated herein by reference in its entirety.

The torque estimation module 342 also includes a sixth summer module 442 that determines the estimated torque and provides the estimated torque to the third difference module 420. The sixth summer module 442 determines the estimated torque based on a sum of the airflow torque and the torque adjustment value (i.e., the ΔT). In this manner, the torque adjustment value is also reflected in the estimated torque when the torque adjustment value is a value other than zero. In other words, the torque estimation module 342 adjusts the estimated torque based on the torque adjustment value. For purposes of illustration only, the sixth summer module 442 determines the estimated torque value using the equation:

$$\text{Estimated Torque}=\text{Airflow Torque}+DT. \quad (12)$$

Referring now to FIG. 3D, a functional block diagram of an exemplary torque adjustment system 450 is presented. The torque adjustment system 450 according to the principles of the present disclosure includes a disabling module 452 and a torque adjustment module 454.

The disabling module 452 selectively disables the torque adjustment module 454 based on various parameters. For example only, the disabling module 452 may selectively disable the torque adjustment module 454 based on engine runtime, the APC, electric motor torque, the control mode, vehicle speed, the RPM, transmission oil temperature, the ECT, and/or the IAT. The disabling module 452 may also selectively disable the torque adjustment module 454 based on a difference between the IAT and ambient air temperature, the state of the A/C compressor (i.e., ON/OFF), a difference between two APC samples, a difference between to electric motor torques, and/or the RPM error value.

For example only, the disabling module 452 may disable the torque adjustment module 454 when the engine runtime is less than a predetermined period. In other words, the disabling module 452 may disable the torque adjustment module 454 until the engine runtime reaches the predetermined period. The engine runtime corresponds to the period of time that the engine 102 has been running since the driver keyed on the vehicle. In other words, the engine runtime corresponds to the period of time passed since vehicle startup. The predetermined period may be calibratable and may be set to, for example, between approximately 25.0 and approximately 60.0 seconds.

The disabling module 452 may also disable the torque adjustment module 454 when the APC is greater than a predetermined APC. The predetermined APC may be calibratable and may be set based on the status of the A/C compressor. For example only, the predetermined APC may be set to approximately 130.0 when the A/C compressor is OFF and to approximately 150.0 when the A/C compressor is ON.

The disabling module 452 may also disable the torque adjustment module 454 when the electric motor (EM) torque is greater than a predetermined EM torque. The EM torque may correspond to the amount of torque that the electric motor 198 is producing or is commanded to produce. The predetermined EM torque may be calibratable and may be set to, for example, approximately 5.0 Nm.

The disabling module 452 may also disable the torque adjustment module 454 when the control mode is the torque mode. In other words, the disabling module 452 may disable the torque adjustment module 454 when the control mode is a control mode other than the RPM mode. In this manner, the estimated torque and the commanded torque are adjusted for the torque adjustment value when the control mode is the RPM mode.

The disabling module 452 may also disable the torque adjustment module 454 when the vehicle speed is greater than a predetermined vehicle speed. The predetermined speed may be calibratable and may be set to, for example, approximately 1.0 kilometer per hour (kph). The vehicle speed may be, for example, a transmission output speed, a wheel speed, and/or another suitable measure of the vehicle speed.

The disabling module 452 may also disable the torque adjustment module 454 when the RPM is greater than a predetermined RPM. The predetermined RPM may be calibratable and may be set, for example, based on an idle RPM for the engine 102. For example only, the predetermined RPM may be set to approximately 25.0 rpm greater than the idle RPM. In various implementations, the predetermined RPM may be set to approximately 800.0 when the A/C compressor is OFF and to approximately 850.0 when the A/C compressor is ON.

The disabling module 452 may also disable the torque adjustment module 454 when the transmission oil temperature is less than a predetermined transmission oil temperature. The predetermined transmission oil temperature may be calibratable and may be set to, for example, approximately 40.0° C. The disabling module 452 may also disable the torque adjustment module 454 when the ECT is outside of a predetermined range of coolant temperatures. The predetermined range of coolant temperatures may be calibratable and may be set to, for example, from approximately 70.0° C. to approximately 110.0° C.

The disabling module 452 may also disable the torque adjustment module 454 when the IAT is greater than a predetermined IAT. The IAT may be calibratable and may be set to, for example, approximately 65.0° C. The disabling module 452 may also disable the torque adjustment module 454 when a difference between the IAT and the ambient air temperature is greater than a predetermined temperature difference. The predetermined temperature difference may be calibratable and may be set to, for example, approximately 20.0° C.

The disabling module 452 may also disable the torque adjustment module 454 when a difference between two APCs is greater than a predetermined APC difference. The APCs may be provided at a predetermined rate, such as once per firing event. The predetermined APC difference may be calibratable and may be set to, for example, approximately 3.5.

The disabling module 452 may also disable the torque adjustment module 454 when a difference between two EM torques is greater than a predetermined EM torque difference. The predetermined EM torque difference may be calibratable and may be set to, for example, approximately 1.0 Nm.

The disabling module 452 may also disable the torque adjustment module 454 when the RPM error value is greater than a predetermined RPM error value. The predetermined RPM error value may be calibratable and may be set to, for example, approximately 20.0 rpm. For summary purposes only, the following description of when the disabling module 452 may disable the torque adjustment module 454 is provided. The disabling module 452 may disable the torque adjustment module 454 when:

(1) the engine runtime is less than the predetermined period;
(2) the APC is greater than a predetermined APC;
(3) the EM torque is greater than a predetermined EM torque;
(4) the control mode is a mode other than the RPM mode;
(5) the vehicle speed is greater than the predetermined vehicle speed;
(6) the RPM is greater than the predetermined RPM;
(7) the transmission oil temperature is less than the predetermined transmission oil temperature;
(8) the ECT is outside of the predetermined range of coolant temperatures;
(9) the IAT is greater than the predetermined IAT;
(10) the difference between the IAT and ambient air temperature is greater than the predetermined temperature difference;
(11) the difference between two APCs is greater than the predetermined APC difference;
(12) the difference between two EM torques is greater than the predetermined EM torque difference; or
(13) the RPM error value is greater than the predetermined RPM error value.

The disabling module 452 may also selectively disable the torque adjustment module 454 based on a delay time. More specifically, the disabling module 452 may disable the torque adjustment module 454 when the delay time is less than a predetermined delay period. The delay time corresponds to the period of time passed since the disabling module 452 last disabled the torque adjustment module 454 due to at least one of the above mentioned disabling criteria. The predetermined delay period may be calibratable and may be set to, for example, approximately 5.0 seconds. In this manner, the torque adjustment module 454 is enabled once the disabling module 452 has not disabled the torque adjustment module 454 for at least the predetermined delay period.

The torque adjustment module 454 determines and outputs the torque adjustment value (i.e., the ΔT) based on the RPM-torque integral term (i.e., the $I_{RPMT}$). For example only, the torque adjustment module 454 may determine the torque adjustment value from a lookup table of torque adjustment values indexed by RPM-torque integral terms. The torque adjustment module 454 may also apply a filter (e.g., a low-pass filter) to the RPM-torque integral term before determining the torque adjustment value.

The torque adjustment module 454 may also adjust the torque adjustment value based on the transmission state and/or the A/C compressor state. For example only, the torque adjustment module 454 may add an offset to the torque adjustment value when the transmission is in a state other than a park state or a neutral state and/or when the A/C compressor is ON.

The torque adjustment module 454 provides the torque adjustment value to the closed-loop torque control module 340 and the torque estimation module 342. The closed-loop torque control module 340 and the torque estimation module 342 determine the commanded torque and the estimated torque, respectively, based on the torque adjustment value. In this manner, the closed-loop torque control module 340 and the torque estimation module 342 adjust the commanded torque and the estimated torque, respectively, based on the torque adjustment value.

Referring back to FIG. 2, the closed-loop torque control module 340 outputs the commanded torque to the predicted torque control module 326. The predicted torque control module 326 receives the commanded torque and the control mode. The predicted torque control module 326 may also receive other signals such as the MAF, the RPM, and/or the MAP.

The predicted torque control module 326 determines desired engine parameters based on the commanded torque. For example, the predicted torque control module 326 determines a desired manifold absolute pressure (MAP), a desired throttle area, and/or a desired air per cylinder (APC) based on the commanded torque. The throttle actuator module 116 adjusts the throttle valve 112 based on the desired throttle area. The desired MAP may be used to control the boost actuator module 162, which then controls the turbocharger 160 and/or a supercharger to produce the desired MAP. The phaser actuator module 158 may control the intake and/or exhaust cam phasers 148 and 150 to produce the desired APC. In this manner, the predicted torque control module 326 commands the adjustment of various engine parameters to produce the commanded torque.

The first selection module 328 receives the desired immediate torque from the actuation module 320 and the RPM control desired immediate torque (i.e., the desired immediate $torque_{RPM}$) from the RPM control module 334. The first selection module 328 also receives the control mode from the mode determination module 332.

The first selection module 328 selects and outputs one of the desired immediate torque and the RPM control desired immediate torque based on the control mode. For example only, the first selection module 328 selects and outputs the RPM control desired immediate torque when the control mode is the RPM mode. The first selection module 328 selects and outputs the immediate torque request when the control mode is the torque mode. The output of the first selection module 328 is referred to as the desired immediate torque.

The immediate torque control module 324 receives the desired immediate torque. The immediate torque control module 324 sets the spark timing via the spark actuator module 126 to achieve the desired immediate torque. For example only, the immediate torque control module 324 may adjust the spark timing from the calibrated spark timing (e.g., MBT timing) in order to produce the desired immediate torque. In diesel engine systems, the immediate torque control module 324 may control amount or timing of fuel supplied to the engine 102 to achieve the desired immediate torque.

Figure 4:
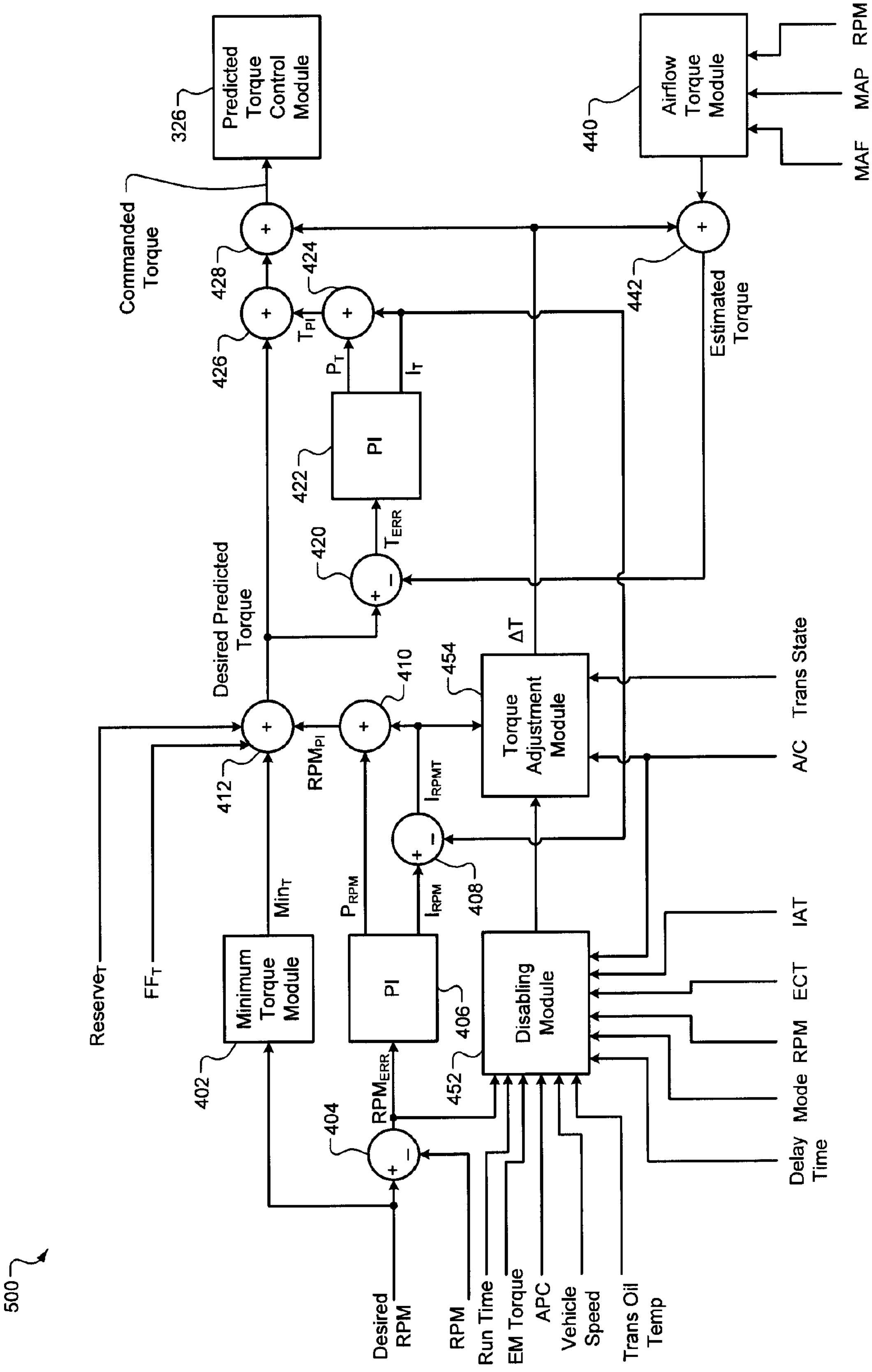
FIG. 4 is a functional block diagram of an exemplary torque control system according to the principles of the present disclosure.

Referring now to FIG. 4, a functional block diagram of an exemplary torque control system 500 is presented. The torque control system 500 includes the minimum torque module 402, the difference modules 404, 408, and 420, the PI modules 406, and 422, and the summer modules 410, 412, 424, 426, 428, and 442.

The torque control system also includes the airflow torque module 440, the disabling module 452, and the torque adjustment module 454. While the modules of the torque control system 500 are described and shown as being within specified other modules, the modules of the torque control system 500 may be configured in another suitable configuration and/or located in another suitable location. For example only, the modules of the torque control system 500 may be located externally to the modules described above.

Figure 5:
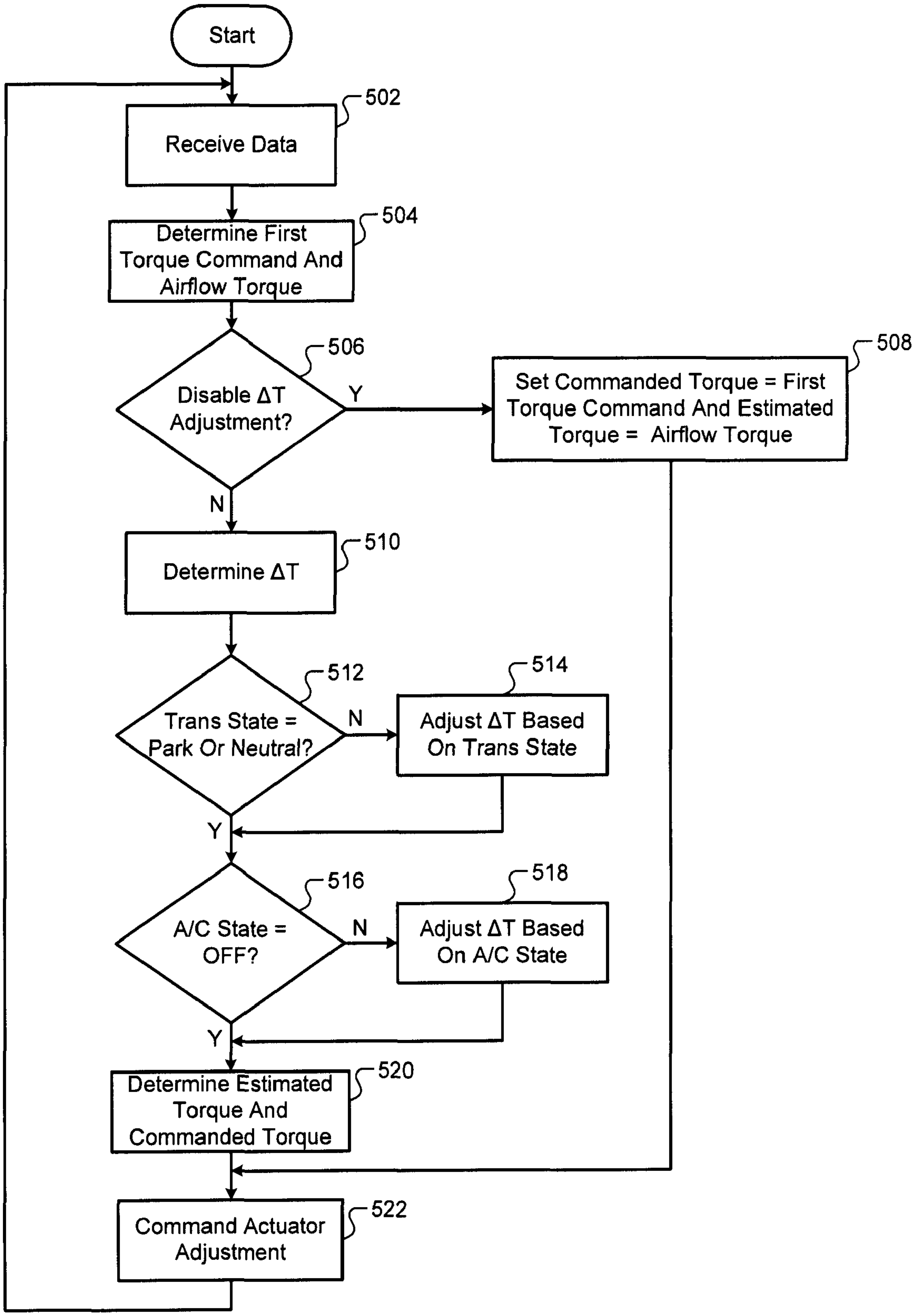
FIG. 5 is a flowchart depicting exemplary steps performed by the torque control system according to the principles of the present disclosure.

Referring now to FIG. 5, a flowchart depicting exemplary steps performed by the torque control system 500 is presented. Control begins in step 502 where control receives data. For example only, the received data may include the desired RPM, the RPM, the EM torque, the engine runtime, the APC, and the vehicle speed. The received data may also include the transmission oil temperature, the control mode, the RPM error, the ECT, the IAT, the A/C state, the transmission state, and the delay time.

Control continues in step 504 where control determines the first torque command and the airflow torque. Control determines the first torque command based on a sum of the torque correction factor and the desired predicted torque. Control determines the airflow torque based on the MAF, the MAP, the APC, and/or the RPM.

In step 506, control determines whether to disable torque adjustment. In other words, control determines whether to disable the torque adjustment module 454 in step 506. If true, control transfers to step 508. If false, control continues to step 510. Control determines whether to disable torque adjustment based on the disabling criteria described above.

Control sets the estimated torque equal to the airflow torque and the commanded torque equal to the first torque command in step 508. In other words, the estimated torque and the commanded torque do not include a torque adjustment when torque adjustment is disabled. Alternatively, the torque adjustment value may be zero when torque adjustment is disabled. Control then continues to step 522 as described below.

In step 510 (i.e., when control determines not to disable torque adjustment), control determines the torque adjustment value (i.e., the ΔT). Control determines the torque adjustment value based on the RPM-torque integral value. For example only, control may determine the torque adjustment value from a lookup table of torque adjustment values indexed by RPM-torque integrals.

Control determines whether the transmission state is the parked state or the neutral state in step 512. If false, control transfers to step 514. If true, control proceeds to step 516. In step 514, control adjusts the torque adjustment value based on the transmission state. For example only, control may adjust the torque adjustment value by adding an offset determined based on the transmission state. In this manner, control adjusts the torque adjustment value when the transmission state is the drive state or the reverse state. Control then continues to step 516.

In step 516, control determines whether the A/C compressor is OFF. If false, control transfers to step 518. If true, control continues to step 520. Control adjusts the torque adjustment value based on the A/C compressor state in step 518. For example only, control may adjust the torque adjustment value by adding an offset determined based on the A/C compressor being ON. Control continues to step 520.

Control determines the estimated torque and the commanded torque in step 520. More specifically, control determines the estimated torque based on a sum of the airflow torque and the torque adjustment value. Control determines the commanded torque based on a sum of the first torque command and the torque adjustment value. In this manner, control adjusts the commanded and estimated torques based on the torque adjustment value. Control commands adjustment of the actuators based on the commanded torque in step 522, and control returns to step 502.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

a first integral module that determines an engine speed (RPM) integral value based on a difference between a desired RPM and a measured RPM;

a second integral module that determines a torque integral value based on a difference between a desired torque output for an engine and an estimated torque of said engine;

a summer module that determines an RPM-torque integral value based on a difference between said RPM and torque integral values; and a torque adjustment module that determines a torque adjustment value based on said RPM-torque integral value and that adjusts said desired torque output and said estimated torque based on said torque adjustment value.

2. The engine control system of claim 1 further comprising a disabling module that disables said torque adjustment module when an engine runtime is less than a predetermined period.

3. The engine control system of claim 1 further comprising a disabling module that disables said torque adjustment module when an air-per-cylinder (APC) is greater than a predetermined APC.

4. The engine control system of claim 1 further comprising a disabling module that disables said torque adjustment module when a change in air-per-cylinder (APC) is greater than a predetermined APC change.

5. The engine control system of claim 1 further comprising a disabling module that disables said torque adjustment module when an electric motor (EM) torque output is greater than a predetermined torque.

6. The engine control system of claim 1 further comprising a disabling module that disables said torque adjustment module when a change in torque output by an electric motor (EM) is greater than a predetermined EM torque change.

7. The engine control system of claim 1 further comprising a disabling module that disables said torque adjustment module when a vehicle speed is greater than a predetermined vehicle speed.

8. The engine control system of claim 1 further comprising a disabling module that disables said torque adjustment module when said measured RPM is greater than a predetermined RPM.

9. The engine control system of claim 1 further comprising a disabling module that disables said torque adjustment module when said difference between said desired and measured RPMs is greater than a predetermined RPM error.

10. The engine control system of claim 1 further comprising a disabling module that disables said torque adjustment module when a transmission oil temperature is less than a predetermined temperature.

11. The engine control system of claim 1 further comprising a disabling module that disables said torque adjustment module when an engine coolant temperature (ECT) is one of less than a predetermined minimum ECT and greater than a predetermined maximum ECT.

12. The engine control system of claim 1 further comprising a disabling module that disables said torque adjustment module when an intake air temperature (IAT) is greater than a predetermined IAT.

13. The engine control system of claim 1 further comprising a disabling module that disables said torque adjustment module when a change in intake air temperature (IAT) is greater than a predetermined IAT change.

14. The engine control system of claim 1 further comprising a predicted torque control module that adjusts at least one engine airflow actuator based on said adjusted desired torque output.

15. The engine control system of claim 1 wherein said torque adjustment module selectively increases said torque adjustment value based on a predetermined torque offset when a transmission is in one of drive and reverse.

16. The engine control system of claim 1 wherein said torque adjustment module selectively increases said torque adjustment value based on a predetermined torque offset when an air conditioning (A/C) compressor is ON.

17. The engine control system of claim 1 wherein said torque adjustment module adds said torque adjustment value to each of said desired torque output and said estimated torque.

18. An engine control method comprising:

determining an engine speed (RPM) integral value based on a difference between a desired RPM and a measured RPM;

determining a torque integral value based on a difference between a desired torque output for an engine and an estimated torque of said engine;

determining an RPM-torque integral value based on a difference between said RPM and torque integral values;

determining a torque adjustment value based on said RPM-torque integral value; and adjusting said desired torque output and said estimated torque based on said torque adjustment value.

19. The engine control method of claim 18 further comprising disabling said adjusting when an engine runtime is less than a predetermined period.

20. The engine control method of claim 18 further comprising disabling said adjusting when an air-per-cylinder (APC) is greater than a predetermined APC.

21. The engine control method of claim 18 further comprising disabling said adjusting when a change in air-per-cylinder (APC) is greater than a predetermined APC change.

22. The engine control method of claim 18 further comprising disabling said adjusting when an electric motor (EM) torque output is greater than a predetermined torque.

23. The engine control method of claim 18 further comprising disabling said adjusting when a change in torque output by an electric motor (EM) is greater than a predetermined EM torque change.

24. The engine control method of claim 18 further comprising disabling said adjusting when a vehicle speed is greater than a predetermined vehicle speed.

25. The engine control method of claim 18 further comprising disabling said adjusting when said measured RPM is greater than a predetermined RPM.

26. The engine control method of claim 18 further comprising disabling said adjusting when said difference between said desired and measured RPMs is greater than a predetermined RPM error.

27. The engine control method of claim 18 further comprising disabling said adjusting when a transmission oil temperature is less than a predetermined temperature.

28. The engine control method of claim 18 further comprising disabling said adjusting when an engine coolant temperature (ECT) is one of less than a predetermined minimum ECT and greater than a predetermined maximum ECT.

29. The engine control method of claim 18 further comprising disabling said adjusting when an intake air temperature (IAT) is greater than a predetermined IAT.

30. The engine control method of claim 18 further comprising disabling said adjusting when a change in intake air temperature (IAT) is greater than a predetermined IAT change.

31. The engine control method of claim 18 further comprising adjusting at least one engine airflow actuator based on said adjusted desired torque output.

32. The engine control method of claim 18 further comprising selectively increasing said torque adjustment value based on a predetermined torque offset when a transmission is in one of drive and reverse.

33. The engine control method of claim 18 further comprising selectively increasing said torque adjustment value based on a predetermined torque offset when an air conditioning (A/C) compressor is ON.

34. The engine control method of claim 18 wherein said adjusting comprises adding said torque adjustment value to each of said desired torque output and said estimated torque.

* * * * *